United States Patent [19]

Dimov

[11] Patent Number: 5,165,832
[45] Date of Patent: Nov. 24, 1992

[54] REMOVABLE B-NUT RETAINING WIRE

[75] Inventor: Mina Dimov, Cincinnati, Ohio

[73] Assignee: General Electric Company, Cincinnati, Ohio

[21] Appl. No.: 751,385

[22] Filed: Aug. 28, 1991

[51] Int. Cl.$^5$ .................. F16B 39/04; F16L 37/00; B23P 25/00

[52] U.S. Cl. ................... 411/300; 411/319; 411/362; 411/902; 285/305; 29/458; 29/525.1

[58] Field of Search .......... 411/300, 319, 352, 353, 411/357, 358, 362, 365, 513, 940, 945, 351, 914; 29/458, 525.1; 285/305; 403/326

[56] References Cited

U.S. PATENT DOCUMENTS

| | | | |
|---|---|---|---|
| 1,740,308 | 12/1929 | Kraber | 411/300 |
| 1,899,343 | 2/1933 | Mackey et al. | 411/365 |
| 2,458,714 | 1/1949 | Mahoney . | |
| 2,597,482 | 5/1952 | Harrison et al. . | |
| 3,084,751 | 4/1963 | Scarborough | 285/305 |
| 3,200,690 | 8/1965 | Dickman | 411/351 |
| 3,239,244 | 3/1966 | Leinfelt | 285/305 |
| 3,244,625 | 4/1966 | Silwones | 411/914 |
| 3,462,727 | 8/1969 | Blight et al. . | |
| 4,019,593 | 4/1977 | Craig | 403/326 |
| 4,427,221 | 1/1984 | Shay, Jr. . | |
| 4,679,825 | 7/1987 | Taylor . | |
| 4,749,192 | 6/1988 | Howeth . | |

FOREIGN PATENT DOCUMENTS

457822  1/1975  U.S.S.R. ................ 411/902

*Primary Examiner*—Neill R. Wilson
*Attorney, Agent, or Firm*—Jerome C. Squillaro; John R. Rafter

[57] ABSTRACT

A unitary retaining device is removably insertable into a connector. The retaining device includes a unitary wire having a first end integrally formed as a handle of any suitable geometric shape and a second end of which is radiused, wire shaped and annealed to improve its malleability for both insertion and removal from the connector. A coating may be applied to the surface of the wire to improve the insertion and extraction characteristics of the wire. The handle may be heat treated to improve its strength. The wire is insertable into a circumferential groove of the connector, with the handle protruding outwardly from the connector after insertion, to allow for extraction.

14 Claims, 3 Drawing Sheets

PRIOR ART

REMOVABLE B-NUT RETAINING WIRE

BACKGROUND OF THE INVENTION

The present invention relates to a wire-locked coupling apparatus and, more particularly, to a wire-locked B-nut for coupling pipes or conduit which contain fluid, wherein the B-nut is secured by a removable retaining device.

There are a wide variety of connectors which are used to couple different pipes or tubes together. Some known connectors rely on the use of solder to form a seal between the tube and the connector, particularly when fluid flows through the joined conduit. In many applications, however, the connector needs to be removed to disassemble the coupled tubes in order to clean the conduit or to access a component blocked by the coupled tubes. Hence, a seal such as solder creates several problems. For example, solder seal connectors are only suitable for use with conduit which contains fluid at relatively low pressure, and cannot be used in high pressure systems. Also, the solder seal is difficult to remove, and removal of the solder will usually destroy the connector and, possibly, the conduit.

One type of known connector uses a retaining or locking wire, insertable into a groove along the inside circumference of the connector, to secure the connector to the tube and take out the axial seating loads. When the wire is inserted in the connector, it disappears into the connector along the groove. Although this type of seal overcomes many of the problems associated with the solder seal, the connector is still destroyed when disassembly is required, as the connector must be cut to be removed.

In an effort to overcome this problem, an alternative embodiment also discloses a composite structure of a wire and an attached end wherein the wire is insertable into a groove along the interior circumference of the connector the end protrudes from the connector after insertion of the wire into the connector. While it is intended that the protruding end can be grasped and pulled to remove the wire from the connector without destroying the connector, experience has shown that the end can become detached from the wire leaving the wire resident in the connector. Although this composite structure alternative overcomes some of the problems encountered by previous embodiments, a number of problems still exist. For example, the protruding end is formed separately from the wire, and then attached, creating a weak joint or stress concentration at the attachment. This weak joint can break during insertion or removal of the wire, causing separation of the protruding end from the wire and thereby making removal of the wire impossible without destroying the connector.

There thus exists a need for a connector seal which reduces the stress concentration at the interface between the protruding end and the wire, thereby reducing the possibility of the protruding end separating from the wire during wire removal.

SUMMARY OF THE INVENTION

This need is met by the retaining device according to the present invention, wherein a unitary removable retaining wire is formed integrally with a handle at one end. The other end is shaped as a wire and is insertable into a circumferential groove in a connector through an aperture in the connector, in order to hold the connector to a conduit. The handle protrudes outwardly from the connector after insertion to allow the handle to be gripped to pull the wire out of the connector when disassembly is desired.

In accordance with one aspect of the present invention, a retaining device comprises unitary structure comprising a removable wire, with a handle formed integrally with the wire at a first end of the wire and a radiused surface formed integrally with the wire at a second end of the wire. An annealing process is applied to make wire away from the handle malleable, making the wire less apt to break during insertion or removal of the wire. A coating such as a dry film lubricant layer or a silver plating layer may be applied to the surface of the retaining device. Additionally, the handle, which may be any suitable geometric shape, may include an aperture into which a safety wire may be inserted. Finally, a heat treating process may be applied to strengthen the handle.

An advantage of this device is that the wire and more particularly the malleable portion thereof can be easily inserted and removed from a connector without destroying the connector, allowing for reuse of the connector. The stress concentration at the interface between the handle and the wire is reduced, because the handle is formed integrally with the wire, thereby reducing the possibility of the handle separating from the wire during removal of the wire from the connector. The annealing process makes the wire more flexible and reduces the possibility of breakage of the wire during removal of the wire from the connector.

The present invention also provides for a method of removably connecting a connector to a conduit. The method comprises the steps of providing the connector, the connector having a first aperture extending from an outer surface to an inner surface and a circumferential groove extending around the inner surface. A unitary removeable retaining wire is formed integrally having a handle formed at a first end and a radiused second end. The method also comprises the steps of annealing the integral wire to make the integral wire more malleable, coating the surface of the wire, and inserting the radiused second end of the integral wire into the first aperture of the connector to removably secure the connector to a conduit. An advantage of the application of a coating to the wire is that the coating improves installation and removal characteristics of the wire during insertion of the wire into a connector and subsequent extraction of the wire from the connector.

The integral wire is removable from the connector to permit disassembly of the connector from the conduit by gripping and pulling the handle of the integral wire which protrudes from the first aperture after insertion of the wire. The protruding handle on the first end of the wire provides the advantage of allowing simple, non-destructive disassembly of the connector from the conduit. An advantage of the radiused second end is that it improves the ease of insertion by eliminating the catch end which is typical of a squared end, preventing gouging of the connector as the wire is inserted in place.

Other objects and advantages of the invention will be apparent from the following description, the accompanying drawings and the appended claims.

DETAILED DESCRIPTION OF THE PREFERRED EMBODIMENTS

The present invention provides a unitary retaining device insertion and removeable from an internally grooved and torqued threaded connection. The retaining device preferably comprises a unitary structured wire including a handle portion at a first end integrally formed with a solid cylindrical extension extending from the handle to a second end and including radiused surface formed integrally with the second end of the unitary structure wherein the solid cylindrical extension and second end are annealed for malleability whereby the unitary structured wire provides for easy and one piece insertion and removal from an internally grooved connection to permit disassembly of the connector from a conduit. The integral structured wire includes a handle at a first end which protrudes from the connector after insertion and may be gripped and pulled to remove the wire from the connector when desired. This allows simple, non-destructive disassembly of the connector from the conduit. The integral wire also includes a radiused second end to improve the ease of insertion by eliminating the catch end typical of a squared end, preventing gouging of the connector as the wire is inserted in place.

Figure 1:
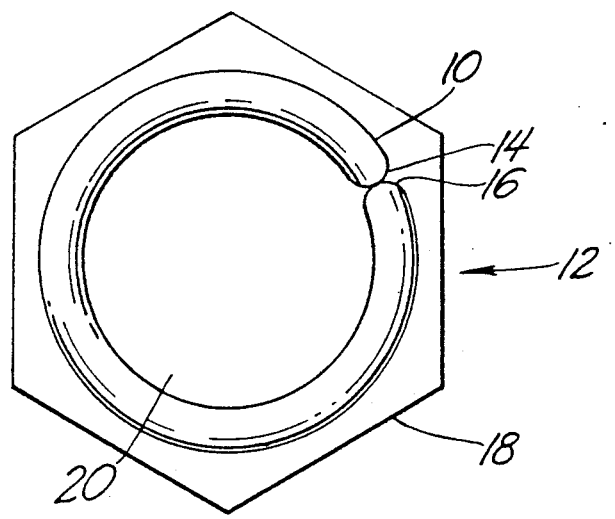
FIG. 1 illustrates a prior art device wherein a wire is embedded in a connector.

Referring now to the drawings, in FIG. 1 there is illustrated a prior art wire 10 inserted in a connector 12. The wire 10 is completely embedded in the connector 12 after insertion, with both ends 14 and 16 positioned below an outer surface 18 of the connector 12. After insertion, the wire 10 circumscribes a center aperture 20 in the connector 12. The wire 10 helps to insure that the connector 12 stays attached to conduit, usually insertable through the center aperture 20 to permit fluid flow through the conduit. Occasionally, however, it is desirable to detach the connector 12 from the conduit, to permit cleaning of the parts, or to permit access to another component. With the apparatus of FIG. 1, the connector 12 must be cut to be detached from the conduit, as the wire 10 holding the connector 12 to the conduit cannot be removed. This destroys the connector 12, requiring replacement of the connector 12 each time the connector 12 is detached from the conduit.

Figure 2:
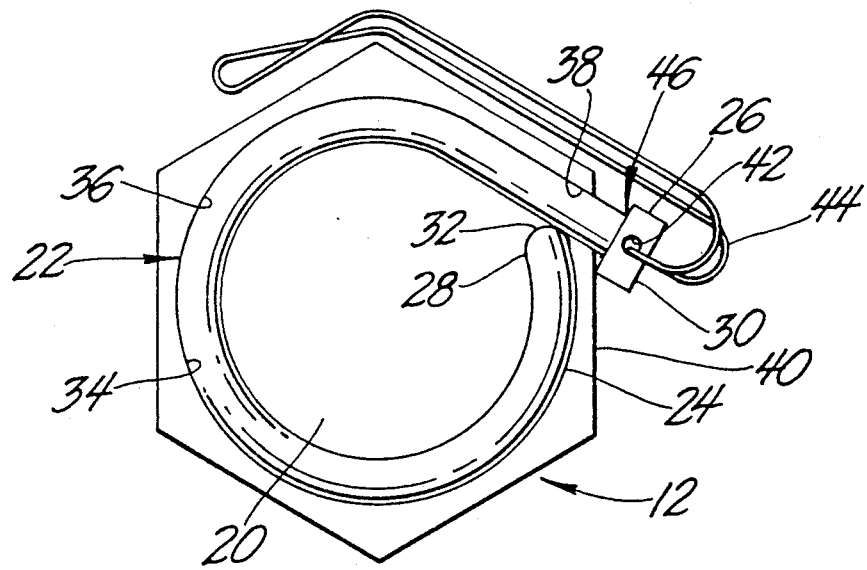
FIG. 2 illustrates the subject invention wherein a retaining device with a protruding handle is inserted in the connector of FIG. 1.

Referring now to FIG. 2, a retaining device 22 is inserted in the connector 12. The connector 12 shown in FIG. 2 may be any type of connector, such as a B-nut. An advantage of the present invention is that the retaining device 22 can be adapted for use with existing connectors, without requiring redesign of the connector 12. The retaining device 22 comprises a unitary or one piece structured wire 24, the wire 24 having a first end 26 and a second end 28. The first end 26 can be a handle 30 integrally formed with the wire 24. A solid cylindrical extension extends from the first end handle 26 to the second end 28 can include a radiused surface 32, also integrally formed with the wire 24.

Figure 3:
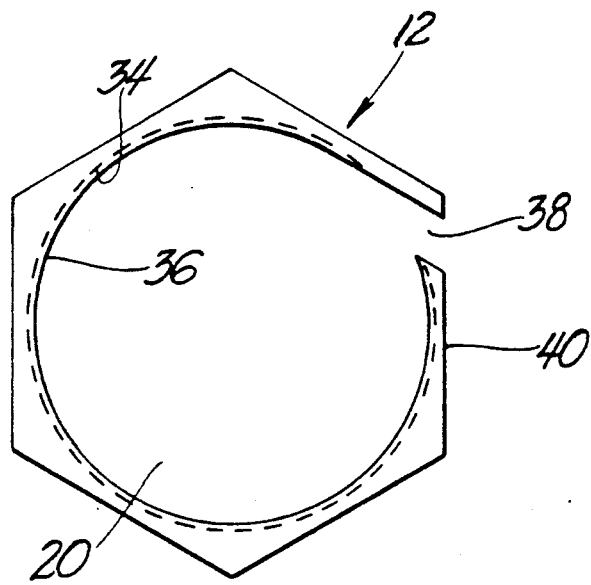
FIG. 3 illustrates the connector of FIGS. 1 and 2 without an inserted wire or device.

A circumferential groove 34 extends around an inner surface 36 of the connector 12, as best illustrated in FIG. 3. The wire 24 follows the groove 34 as the wire 24 is inserted into the connector 12. The radiused second end 28 of the integral wire 24 is inserted into the connector 12 through a first aperture 38 of the connector 12, which extends from an outer surface 40 through to the center aperture 20 of the connector 12. After the integral wire 24 is inserted in the connector 12, the handle 30 protrudes from the first aperture 38, as shown in FIG. 2. The protruding handle 30 may be any geometric shape such as round, square, rectangular, or triangular, but preferably a shape which may be gripped easily, without the need for a special tool. After assembly, torque is applied to the threaded connection to sustain fluid flow.

Continuing now with FIG. 2, the retaining device 22 is a removable wire. That is, the retaining device 22 is removable from the connector 12 to permit disassembly of the connector 12 from conduit by gripping and pulling the protruding handle 30 of the integral wire 24. The present invention may include means for annealing the integral wire 24 to make the wire 24 malleable and easy to remove. The malleability provides the advantage of reducing stress on the wire 24, thereby reducing the possibility of the wire breaking off inside the connector during insertion and subsequent removal of the wire 24. The malleability of the wire 24 and the unitary and integral design of the retaining device 22 eliminates the interface between the wire 24 and the handle 30 to reduce or eliminate the stress concentration which might otherwise occur at the interface so the wire can be easily removed from the connector 12 without causing damage to the connector 12.

The handle 30 may include a second aperture 42, into which a safety wire 44 may be inserted. When disassembly is required, the safety wire 44 is removed, the connector 12 is untorqued, and the handle 30 is gripped to pull the wire 24 out of the connector 12. The retaining device 22 may include means for heat treating the first end 26 to strengthen the handle 30 and avoid breakage of the handle 30 when it is gripped to remove the wire 24 from the connector 12. Finally, in a preferred embodiment, the handle 30 is integrally formed with a large radius 46 to reduce the stress concentration at the handle 30, thereby reducing the possibility of the handle 30 separating from the remainder of the wire 24 when the handle 30 is gripped and pulled.

Figure 4A:
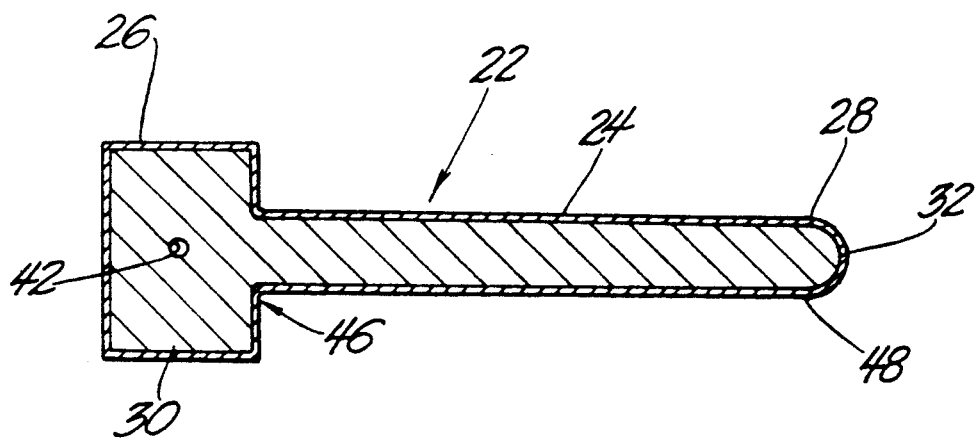
FIGS. 4A and 4B illustrate a cutaway side views of two embodiments of the retaining device insertable in a connector, as shown in FIG. 2.
Figure 4B:
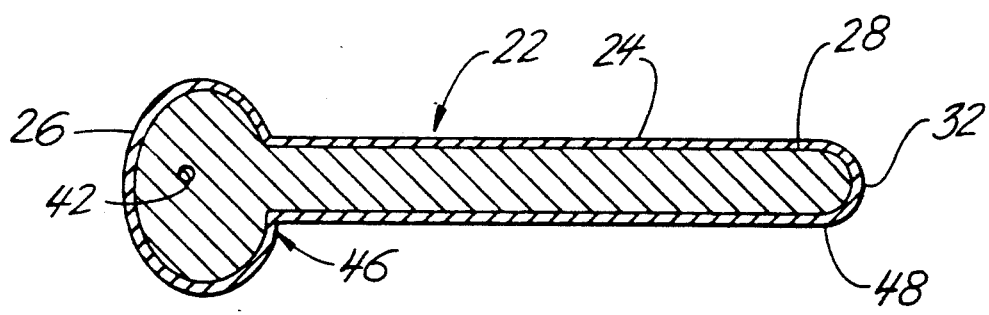

Referring now to FIGS. 4A and 4B, cutaway side views of the retaining device 22 are illustrated. In a preferred embodiment of the present invention, a coating 48 is applied to the surface of the wire 24. The coating 48 may be any suitable anti-seizing material for improving the insertion and extraction characteristics of the wire 24, such as a dry film lubricant layer or a silver plating layer. An advantage of applying the coating 48 to the wire 24 is that the coating 48 improves the insertion and removal characteristics of the wire 24 during insertion of the wire 24 into the connector 12, and subsequent extraction of the wire from the connector 12. The radiused second end 28 further improves the ease of insertion by eliminating the catch end typical of a squared end, preventing gouging of the connector 12 as the wire 24 is inserted into the first aperture 38. "The handle 30 may be suitable shape, including square, as shown in FIG. 4A, or round, as shown in FIG. 4B.

The present invention provides a retaining device 22 which is removably insertable into a connector 12. The retaining device 22 includes an integral wire 24, a first end of which is formed as a handle 30 and a second end of which has a radiused surface 32. The wire 24 is annealed to improve its malleability. A second aperture 42 may be formed in the handle 30 to permit insertion of a safety wire 44. Also, a coating 48 may be applied to the surface of the wire 24 to improve the insertion and removal characteristics of the wire 24. The coating 48 may be any suitable material including a dry film lubricant layer or a silver plating layer. Finally, the handle 30 may be heat treated to improve its strength.

The present invention also provides for a method of removably connecting the connector 12 to any type of conduit, using the retaining device 22. The retaining device 22 is inserted into the circumferential groove 34 of the connector 12, with the handle 30 protruding outwardly from the connector 12 after insertion. The integral wire 24 is removable from the connector 12 to permit disassembly of the connector 12 from the conduit by gripping and pulling the protruding handle 30 of the integral wire 24.

Having described the invention in detail and by reference to the preferred embodiment thereof, it will be apparent that other modifications and variations are possible without departing from the scope of the invention defined in the appended claims.

What is claimed is:

1. A retaining device for insertion and removal from an internally grooved and torqued threaded fluid connection comprising:
    a unitary structured wire including a handle portion at a first end integrally formed with a solid cylindrical extension extending from said handle to a second end for manual insertion within said connection without causing rotation of the connection; and
    a radiused surface formed integrally with said second end of said unitary structured wire, wherein said solid cylindrical extension and second end are annealed for malleability whereby said unitary structured wire provides for easy one piece insertion and removal from said internally grooved fluid connection to secure the connection and contain fluid therein and to allow manual removal of the wire and disassembly of the connection.

2. A retaining device as claimed in claim 1 further comprising an aperture in said first end of said structured wire.

3. A retaining device as claimed in claim 2 further comprising a safety wire insertable in said aperture.

4. A retaining device as claimed in claim 1 further comprising a dry film lubricant layer coated on said surface of said structured wire.

5. A retaining device as claimed in claim 1 further comprising a silver plating layer coated on said surface of said structured wire.

6. A retaining device as claimed in claim 1 wherein said handle has a round shape.

7. A retaining device as claimed in claim 1 wherein said handle is heat treated to strength said handle.

8. A method of removably connecting a threaded connector to conduit comprising the steps of:
    providing said connector, said connector having an outer surface and an inner surface, said connector further having a first aperture extending from said outer surface to said inner surface and a circumferential groove extending around said inner surface;
    forming a unitary retaining device including a handle formed at a first end, a solid cylindrical intermediate portion and a radiused second end, and further having a surface;
    annealing said solid cylindrical intermediate portion and a radiused second end to render said device malleable;
    coating said surface of said integral wire;
    inserting said radiused second end of said integral device into said first aperture of said connector to removably secure said connector to said conduit torque sealing the connection, whereby said unitary device is removable from said connector to permit disassembly of said connector from said conduit by gripping and pulling said device handle which protrudes from said first aperture after insertion.

9. A method as claimed in claim 8 wherein said step of forming an integral device further comprises the step of forming a second aperture in said handle.

10. A method as claimed in claim 9 further comprising the step of inserting a safety wire in said second aperture.

11. A method as claimed in claim 8 wherein said handle has a round shape.

12. A method as claimed in claim 8 further comprising the step of heat treating said handle to strengthen said handle.

13. A method as claimed in claim 8 wherein said step of coating said surface of said integral wire further comprises the step of coating said surface of said integral wire with a dry film lubricant layer.

14. A method as claimed in claim 8 wherein said step of coating said surface of said integral wire further comprises the step of coating said surface of said integral wire with a silver plating layer.

* * * * *